Aug. 20, 1968

W. E. MEINKE 3,397,614

MACHINE TOOL SPINDLE CLAMPING MEANS

Filed Nov. 15, 1965

INVENTOR.
WILBUR E. MEINKE
BY
Hoffmann and Yount
ATTORNEYS

United States Patent Office 3,397,614
Patented Aug. 20, 1968

3,397,614
MACHINE TOOL SPINDLE CLAMPING MEANS
Wilbur E. Meinke, Fairview Park, Ohio, assignor to The New Britain Machine Company, New Britain, Conn., a corporation of Connecticut
Filed Nov. 15, 1965, Ser. No. 507,779
16 Claims. (Cl. 90—11)

ABSTRACT OF THE DISCLOSURE

A device for selectively clamping a spindle of a machine tool to a surrounding sleeve including a wedge clamp around the spindle and a piston between the clamp and the sleeve for actuating the clamp to apply a radial clamping force to the spindle.

Summary of the invention

The present invention relates to machine tools and mroe particularly to machine tools having a tool spindle slidably keyed within a power driven sleeve or quill and to means for selectively binding or clamping together a spindle slidable within a rotatable sleeve or quill.

One of the important objects of the present invention is the provision of a novel and improved apparatus comprising a spindle slidable within a sleeve and fluid pressure operated clamping means for selectively clamping the spindle and sleeve to one another.

A further object of the present invention is the provision of a new and improved machine tool having a spindle member slidable within a sleeve member and fluid pressure operated means for selectively clamping the members together including portions operatively arranged to engage said members to lock said members against relative movement and which clamping means is simple in construction and reliable in operation.

Another object of the present invention is the provision of a new and improved power operated means for selectively clamping a spindle to a rotatable sleeve within which the spindle is slidable and which means can be operated during rotation of the sleeve.

A still further object of the present invention is the provision of a new and improved machine tool comprising a tool spindle slidably keyed within a sleeve or quill which is mounted for rotation in a spindle head by axially spaced bearings, and power operated means for selectively clamping the spindle to the quill and positioned between said bearings and the tool attaching end or face of the spindle so as to minimize the effect of changes in the bearing temperatures on the tool by confining most if not all of the spindle elongation due to such temperature changes to that part of the spindle at the rear of the clamping means.

Another of the important objects of the present invention is the provision of a clamping mechanism for clamping together a spindle slidable within a support member comprising a piston member having a flange at least a portion of which is resilient and adapted to bow into engagement with the spindle or support member, to lock or assist in locking the parts together upon the application of a predetermined fluid pressure to the piston including its flange.

Another object of the present invention is the provision of a clamping mechanism for clamping together a spindle member slidable within a support member comprising an annular piston member surrounding the spindle member and having an inclined surface arranged to mate with an oppositely inclined surface of a split ring member which also surrounds the spindle member so that upon reciprocation of the piston member the mating inclined surfaces of the piston member and split ring member produce a wedging action on the split ring member forcing it radially into clamping engagement with the spindle member or the support member at a plurality of locations, the piston member further including a resilient wall portion adapted to bow into engagement with an adjacent wall of the piston member or the support member to assist in locking the parts together upon application of fluid pressure to the piston member.

A more specific object of the present invention is the provision of a new and improved machine tool having a tool spindle member slidably keyed within a power rotated or driven sleeve or quill member and a clamping mechanism for selectively clamping together the spindle and quill members comprising annular concentric piston and split ring members both surrounding the spindle member and having cooperating inclined surfaces such that upon movement of the piston member the inclined surfaces of the piston and split ring members produce a wedging action on the split ring member forcing it radially into clamping engagement with the spindle member at a plurality of locations about the spindle periphery, the piston member further including a resilient wall portion adapted to be bowed outwardly into clamping engagement with an adjacent wall portion of the rotatable sleeve or quill member.

The present invention resides in certain constructions and combinations and arrangements of parts and further objects and advantages thereof will be apparent to those skilled in the art to which the invention relates from the following description of the preferred embodiment thereof described in reference to the accompanying drawings forming a part of the specification and in which.

Figure 1:
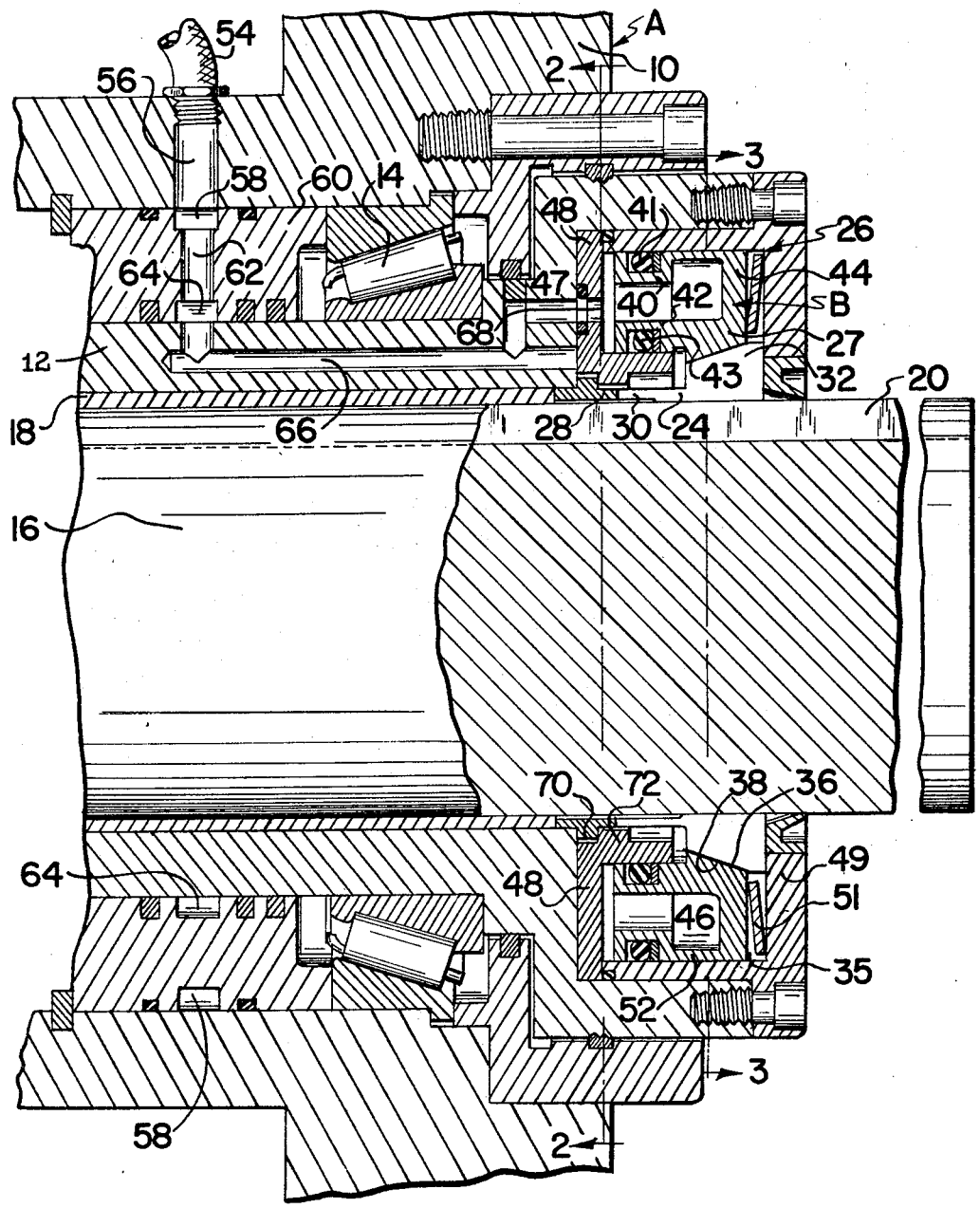
FIG. 1 is a fragmentary vertical sectional view of the front portion of a spindle head of a machine tool embodying the present invention and showing parts in elevation.

While the invention is susceptible of various embodiments and is applicable to various types of machine tools it is herein shown and described as embodied in a spindle head of a combined horizontal boring, drilling, and milling machine of the general character shown in the United States Patents to Stephan No. 2,339,435, issued Jan. 18, 1944, and to Lucas et al. No. 2,350,174, issued May 30, 1944.

The machine shown includes a spindle head A having a frame 10 within which a sleeve or quill 12 is rotatably supported by axially spaced tapered bearings 14, only the front one of which is shown. A spindle 16 is slidably supported within quill 12 by two spaced sleeve bearings 18, only the front one of which is shown. The spindle 16 is mounted for rotation with quill 12 although axially movable relative thereto, by means of a key (not shown) fixed to the quill and engaging a keyway 20 in the spindle 16.

A tool arbor having a tool connected thereto is adapted to be attached to the forward or right-hand end of the spindle as viewed in FIG. 1 by any suitable connecting means, not shown, but well known in the art. The tool may be fed or otherwise moved to and from a workpiece by axial reciprocation of the tool spindle by a suitable tool reciprocating mechanism (not shown) located at the rear or left-hand end of the spindle head. Rotation of the tool is accomplished by a drive means (not shown) which is operatively connected to the quill 12 rearwardly of or to the left of the portion of the quill shown in FIG. 1 and which is effective when operated to rotate the quill 12 which in turn rotates spindle 16 through the key connection therebetween. The drive means for rotating the quill 12 and reciprocating the spindle 16 in the quill will not be described in greater detail as they are not important to an understanding of the invention and any suitable conventional drive means such as those illustrated by the aforementioned patents may be employed for these purposes.

For many operations the quill 12 and spindle 16 are rotated and the spindle 16 is moved axially relative to the quill to feed it to the workpiece. Examples of operations of this type are boring and drilling operations during which the workpiece may be fixed and the rotating tool fed axially to the workpiece. For operations wherein the spindle is not moved axially of the quill, for example, certain milling operations, it is desirable to clamp the spindle to the quill so as to prevent "chattering." According to the provisions of this invention this is accomplished by fluid pressure operated clamping means indicated generally by reference character B which can be operated to lock the spindle to the quill or vice versa without stopping the spindle rotation. The clamping means B shown includes a collet 24 portions of which are moved into engagement with the spindle by a fluid pressure operated motor 26 comprising an annular piston 27. The collet 24 is shown arranged between the spindle and the piston 27 of the motor 26 and comprises an annular member 28 surrounding the spindle having a plurality of axially extending, resilient clamping members, 30, in the preferred embodiment 12, extending axially therefrom towards the front or tool end of the spindle. The free end of each clamping member 30 includes an enlargement or clamping block 32 extending radially therefrom in an outwardly direction and which clamping blocks are adapted to be moved into frictional engagement with the spindle periphery by the motor 26 upon the application of fluid pressure to the left end of the motor 26.

The piston 27 of the fluid pressure operated motor 26 is reciprocable within an annular chamber 35 having an opening in the side thereof facing the collet 24 or the clamping members 30 thereof and into which opening portions of the clamping blocks 32 project. The piston has a continuous inclined or frustoconical interior surface 36 adjacent to it right-hand end surrounding and arranged to mate with the inclined surfaces 38 on the adjoining sides of the clamping blocks 32 projecting into or towards the chamber 35. Movement of the piston 27 to the right as viewed in FIG. 1 produces a wedging engagement between the inclined surfaces 36 and 38 which is effective to force the clamping blocks 32 radially into frictional engagement with the spindle at spaced locations about the periphery thereof. Movement of the piston 34 to the left as viewed in FIG. 1 releases the wedging action on the clamping blocks and the spindle is then free to be moved axially relative to the quill.

The piston 27 includes a pair of concentric annular flanges 40, 42 extending axially towards the rear of the spindle from one side of an annular base portion 44. The two concentric flanges 40 and 42 define with the base portion 44 a fluid pressure chamber 46 opening into the rear portion 47 of the chamber 35 within which the piston 27 reciprocates and the flanges 40 and 42 of the piston slidably engage the adjoining annular walls of the chamber. The leakage of fluid past the piston is prevented by conventional O-rings 41 and 43 carried by the piston 27.

Figure 2:
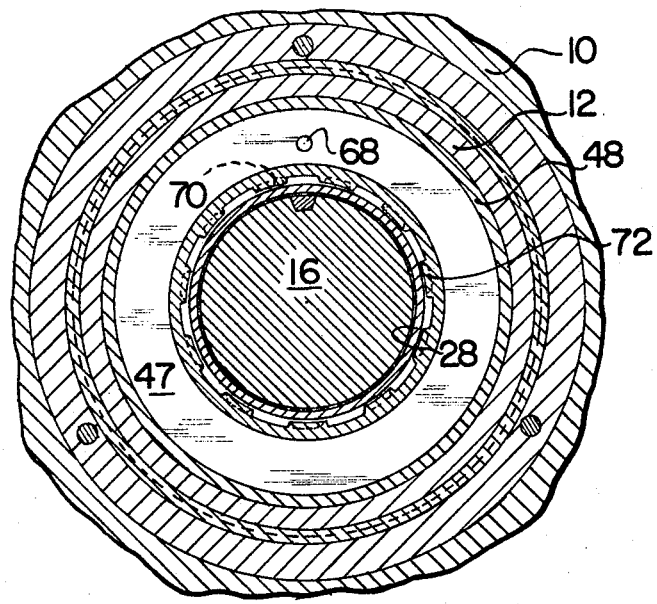
FIG. 2 is a sectional view of the device of FIG. 1 taken substantially along line 2—2 thereof.
Figure 3:
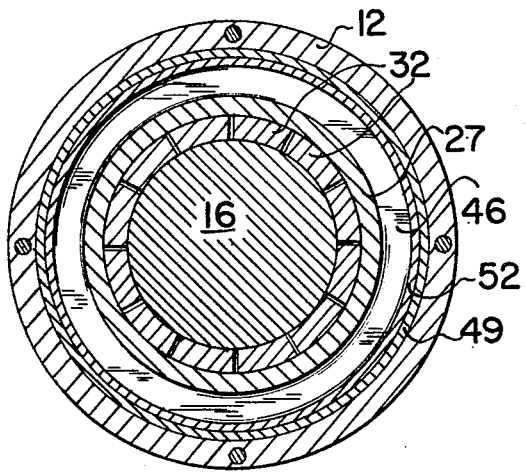
FIG. 3 is a sectional view taken approximately along line 3—3 of FIG. 1.

The chamber 35 comprises, in the embodiment shown in FIGS. 1 through 3, an inner cylinder member 48 which forms the back and the short smaller diameter walls of the cylinder chamber. The cylinder member is located in and held in recess position in an opening into the front of the quill by an outer cylinder member 49 which forms the front and long larger diameter walls of the chamber 35. The outer cylinder member 49 is secured to the quill by suitable threaded fasteners which in effect makes at least the outer cylinder member 49 integral with the quill.

Figure 4:
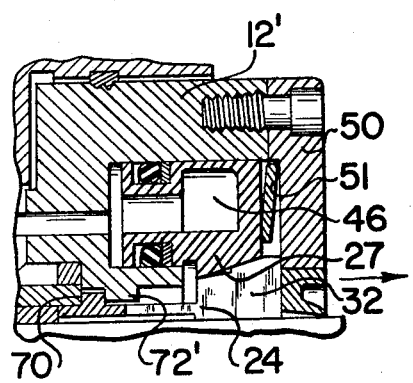
FIG. 4 is a fragmentary vertical section of a modified clamping arrangement showing parts in elevation.

Alternately, chamber 35 could be formed directly in the quill and the inner and outer cylinder members 48, 49 eliminated except for the part of the outer cylinder member which forms the front end wall for the chamber 35. This chamber arrangement is illustrated in FIG. 4 wherein parts identical to parts in FIGS. 1 to 3 have the same reference numeral and corresponding parts of somewhat different constructions are indicated by the same reference numeral with a prime applied thereto. This arrangement shows a closing cap 50 forming the front end wall of the cylinder or chamber 35 and the piston member 27 is slidably supported by cylinder walls which in this arrangement are part of the quill.

The piston 27 is moved in the clamping direction i.e. to the right as viewed in FIG. 1 relative to cylinder members 48, 49 by fluid under pressure which is applied to the piston to cause it to move a small incremental distance, for example, in the order of several thousandths of an inch against the bias of a washer spring 51 arranged between the opposing ends of the piston 27 and the chamber 35. This movement is sufficient to drive the clamping blocks 32 into frictional engagement with the spindle periphery. The clamping action which locks the spindle to the quill is completed by securing the piston 27 to the quill. The locking or binding action between the piston and quill is effected via the outer cylinder member 49 by a resilient wall portion 52 which is preferably annular and which is thinner than the remainder of the piston wall and is such that upon the application of a predetermined fluid pressure in piston chamber 46 the resilient wall portion is expanded radially outwardly into binding engagement with the interior wall of the outer cylinder member 49. The clearance between the resilient wall portion and the outer cylinder member 49 is very small and therefore the degree of outward bowing movement necessary to bind the piston to the quill is very small. When the clamping action has been completed, the spindle 16, the clamping blocks 32, the piston member 27, the cylinder members 48, 49 and quill 12 are locked together to form in effect a unitary structure providing an effective means for clamping the spindle to the quill and for preventing "chattering" while the members are in their clamped relationship.

The spindle is unclamped from the quill by relieving the fluid pressure on piston member 27 permitting the resilient wall portion 52 to contract and to move out of binding engagement with the outer cylinder member 49 and the washer spring 50 biases the piston member 27 to the left releasing the wedging action on clamping blocks 32 and the spindle is then free to be moved axially of the quill.

Fluid under pressure is delivered to and exhausted from the left-hand end portion 47 of the chamber 35 and in turn the piston 27 from a hydraulic power plant on the spindle head frame 10 and which includes a reservoir of fluid, pump, and controls (not shown) which operate suitable valve means (not shown) to control the flow of fluid through a flexible-type conduit 54, a portion of which is shown in FIG. 1 to a radial passageway 56 in the spindle head frame 10. The passageway 56 communicates with an annular passageway 58 around the periphery of a pressure adaptor 60, preferably stationary, positioned about the quill 12 and intermediate the frame 10 and quill. The annular passageway 58 communicates with a passageway 62 extending through the pressure adaptor 60 and terminates in another annular passageway 64 which in turn is in communication with a passageway 66 extending through the quill 12 and terminating in the end portion 47 of the chamber 35 through an opening 68 in the inner cylinder member 48 forming the rear wall of the chamber 35. This fluid communication network provides for continuous flow of fluid under pressure into the chamber 35 during rotation of the spindle relative to the pressure adaptor 60 and frame 10.

When it is desired to clamp of the spindle to the quill, which can be accomplished when the spindle and quill are rotating as well as when the parts are stationary such as prior to a work operation, the controls are operated to admit fluid under pressure through the fluid passageway systems 54, 56, 58, 62, 64, 66, 68 into chamber 35 against the biased piston member 27. The fluid shifts the piston 27 to the right as viewed in FIG. 1 against the bias of washer 51 an incremental distance which produces a wedging action on the clamping blocks 32 focing them into clamping engagement with the spindle periphery. As the piston moves to the right, the fluid pressure builds up in the piston chamber 46 and acts on the resilient wall portion 52 to expand it radially outwardly into engagement with the outer cylinder wall 48 which in effect binds the piston member 27 to the quill 12 completing the clamping operation. To release the spindle so that it can move axially relative to the quill, the chamber 35 is relieved of pressure by appropriate operation of the controls thereby permitting the resilient wall portion 52 to move out of binding engagement with the chamber wall and the piston to move to the left by the action of the spring 51 releasing the pressure on clamping blocks 32 and the spindle 16 can be moved axially relative to the quill.

The apparatus provides for rapid assembly and disassembly of the collet in and from the quill so they can be removed for replacement and/or repair. The collect is assembled in operative relationship in the quill by a quick disconnect type coupling which includes a plurality of spline members 70 disposed about the periphery of the collet 28 which cooperates with a series of spline members 72 disposed about the inner surface or periphery of the inner cylinder member 48 (FIGS. 1 through 3) or formed integral with the quill (FIG. 4). During assemblying of the collet member the spline members 70 are aligned with the openings between the spline member 72 so that members 70 can pass therethrough and the collet member is thereafter rotated a few degrees to establish at least a partial alignment of the spline members 70 and 72 preventing outward axial movement of collet. With the construction shown, the piston member 27, cylinder members 48, 49 and spring 51 are all readily replaceable by removing the outer cylinder member 49.

Apart from the advantages of providing ready accessibility to the parts of the clamping mechanism, the apparatus further provides the advantage of limiting thermal expansion of the spindle because of changes in bearing temperatures to the right of the clamping mechanism so that the accuracy of the tool setting will not be effected thereby. This advantage results from locating the clamping means between the outer tapered bearings 14 and the tool carried by the right end of the spindle since one of the greatest sources of heat in the assembly is from the tapered bearings 14. With the present construction, heat generated by the bearings 14 as well as from the other parts of the assembly which is absorbed by the spindle will cause the spindle to expand to the left of the clamping blocks 32 and as such will not interfere with the tool setting.

Although the invention has been shown and described in considerable detail, it is to be understood that it is not limited to the constructions heretofore specifically referred to, for example, the collet member could consist of a plurality of discrete members spaced at intervals about the spindle. Alternatively, the piston member need not be annular, but could consist of one or more discerte pistons arranged about the spindle.

As a further suggested alternative, the collet member could be external of the piston and the flexible piston wall located adjacent to the spindle.

As a still further suggested modification, the collet member could be omitted and each of the two concentric cylindrical piston wall portions provided with one or more resilient portions.

From the foregoing it will be apparent that the objects heretofore enumerated have been accomplished and that there has been provided a new and improved apparatus for clamping a slidably supported member, preferably one supported in a rotatable power driven sleeve and by which the parts can be fixedly secured together during rotation of the sleeve.

The preferred embodiment shown and described and the alternative constructions mentioned are merely illustrative of the invention, as previously stated and it is the intention to hereby cover all adaptations, modifications and uses coming within the practice of those skilled in the art to which the invention relates and the scope of the appended claims.

Having described my invention, I claim:

1. In a device for selectively clamping a spindle member of a machine tool to a quill member within which the spindle member is slidably supported, clamping means including first means intermediate said spindle member and said quill member and reciprocable axially relative to said members, second means arranged to cooperate with said first means to apply a radial clamping force to one of said members in response to axial movement of said first means in one direction, said second means being fixed against axial movement in said one direction relative to said one member, and hydraulic pressure fluid means for actuating said first means in said one direction to apply said clamping force.

2. In a device for selectively clamping a spindle member of a machine tool to a quill member within which the spindle member is slidably supported, a first member reciprocable axially of the spindle member relative to both said spindle and quill members and mounted intermediate the spindle member and the quill member, a second member cooperating with said first member and having an inclined surface engageable by said reciprocable first member upon movement thereof in one direction producing a wedging force adapted to exert a radial clamping force on the spindle member to secure the spindle member to the quill member, and hydraulic pressure fluid means for actuating said first member to apply said clamping force.

3. In a machine tool a power driven quill member, a spindle member slidably keyed in said quill member, fluid pressure actuated means for clamping said spindle to said quill, said means including a clamping member arranged to clampingly engage one of said first two mentioned members, piston means mounted for reciprocation intermediate said clamping member and the other of said first two mentioned members and adapted when moved in one direction to engage said clamping member and force said clamping member into clamping engagement with one of said first two mentioned members, said piston means further including means for securing it to said other of said first two mentioned members to clamp said spindle member to said quill member.

4. In a machine tool a power driven sleeve member, a spindle member slidably keyed in said sleeve member, a clamping member having a spindle engaging surface arranged to clampingly engage the periphery of said spindle member and having a wedging surface, fluid pressure actuated piston means mounted for reciprocation relative to said clamping member, said piston means including a wedging surface arranged to cooperate with said wedging surface of said clamping member to produce a wedging action therebetween for forcing said spindle engaging surface of said clamping member into frictional clamping engagement with said spindle member, said piston further including means for binding it to said sleeve for interlocking said sleeve member, clamping means and spindle member as a solid unitary assembly.

5. In a machine tool having a rotatable sleeve member within which a spindle member is slidably keyed, means for clamping said spindle member to said sleeve member, said means including a piston member mounted for reciprocation relative to said sleeve member and disposed intermediate said spindle member and said sleeve member, said piston member including a flange at least a portion of which is resilient, said piston member further including a wedging surface, clamping members arranged to clampingly engage one of said first two mentioned members, said clamping members being arranged intermediate said first two mentioned members and including a wedging surface arranged to mate with said wedging surface on said piston member, means for directing fluid under pressure to said piston member to cause said piston member to move in one direction producing a wedging action on said clamping members forcing said clamping members into clamping engagement with one of said first two mentioned members and to bow said resilient portion of said flange of said piston member into engagement of said other of said two mentioned members whereby said spindle member and said quill member become in effect a solid unitary structure.

6. In a machine tool having a rotatable sleeve member within which a spindle member is slidably keyed, an annular piston means surrounding said spindle and mounted for reciprocation relative to said sleeve member and disposed intermediate said spindle member and said sleeve member, said piston means including a flange at least a portion of which is resilient, said piston member further including a wedging surface, clamping members arranged to clampingly engage one of said first two mentioned members, said clamping members being arranged intermediate said first two mentioned members and including a wedging surface arranged to mate with said wedging surface on said piston means, means for directing fluid under pressure to said piston means to cause said piston means to move in one direction producing a wedging action on said clamping members forcing said clamping members into clamping engagement with one of said first two mentioned members and to bow said resilient portion of said flange of said piston means into engagement of said other of said two mentioned members whereby said spindle member and said sleeve member become in effect a solid unitary structure.

7. In a machine tool having a rotatably mounted spindle quill, a tool spindle slidably keyed in said quill, fluid pressure operated means for selectively clamping said spindle to said quill, said clamping means including a plurality of interconnected clamping members arranged about the periphery of said spindle, each of said clamping members having an inclined surface along one side and a spindle engaging surface along the opposing side thereof, an annular piston member reciprocable axially intermediate said clamping members and said quill and having an inclined surface arranged to mate with the inclined surfaces of said clamping members to thereby exert a radial clamping force at spaced locations about said spindle periphery upon the application of fluid pressure to said piston, said piston member further having a resilient wall portion which is adapted to be bowed outward into engagement with said quill upon said application of fluid pressure to said piston.

8. In a machine tool having a rotatable quill member within which a spindle member is slidably keyed, means for clamping said spindle to said quill member, said means including an annular piston member surrounding said spindle and mounted for reciprocation relative to said quill member and disposed intermediate said spindle member and said quill member, said piston member including inner and outer axially extending flanges at least a portion of one of which is resilient, said piston member further including a wedging surface, clamping members arranged to clampingly engage one of said first two mentioned members, said clamping members being arranged intermediate said first two mentioned members and including a wedging surface arranged to mate with said wedging surface on said piston member, means for directing fluid under pressure to said piston member to cause said piston member to move in one direction producing a wedging action on said clamping members forcing said clamping members into clamping engagement with one of said first two mentioned members and to bow said resilient portion of said one flange of said piston member into engagement of said other of said two mentioned members whereby said spindle member and said quill member become in effect a solid unitary structure.

9. In a machine tool having a rotatable spindle quill, a tool spindle slidably keyed in said quill, means for selectively clamping said spindle to said quill, said means including a collet means disposed in surrounding relationship to said spindle and intermediate said spindle and said quill, said collet means including a plurality of clamping blocks each having an inclined wedging surface formed along one side thereof and a spindle engaging clamping surface formed along the opposing side thereof, fluid pressure operated piston means surrounding said collet means and mounted for reciprocation relative to said collet means and disposed intermediate said collet means and said quill, said piston means including a base and radially inner and outer concentric flanges extending axially from said base forming therebetween a fluid pressure receiving chamber, an inclined wedging surface on the interior of said piston means and arranged to wedgingly engage said wedging surface of said clamping blocks to cause said collet means to clampingly engage said spindle in response to the application of fluid pressure in said chamber, said outer flange including a resilient wall portion adapted to bow outwardly in response to application of fluid pressure in said chamber to clampingly engage said quill.

10. In a machine tool having a first member extending within a second member, said members being relatively slidable, the improvement comprising means for selectively securing said members together, said means including clamping structure arranged to clampingly engage one of said members, and fluid pressure actuated piston means mounted for reciprocation between said clamping structure and the other of said members and adapted when moved in one direction to engage said clamping structure and force said clamping structure into binding engagement with said one member, said piston means including means for securing it to said other member when said clamping structure is moved into binding engagement with said one member.

11. In a device for selectively clamping a first member of a machine tool to a surrounding second member, said members being relatively slidable, clamping means including clamp structure arranged around said first member for applying a radial clamping force to one of said members, and clamp structure actuating means between said clamp structure and the other of said members, said actuating means being reciprocal axially relative to said members and cooperatively engageable with said clamp structure for actuating said clamp structure radially into clamping engagement with said one member.

12. Clamping means as claimed in claim 11 including hydraulic pressure fluid means for moving said actuating means into cooperative engagement with said clamp structure.

13. Clamping means as claimed in claim 12 wherein said other member is operatively secured to said actuating means when said actuating means is cooperatively engaged with said clamp structure.

14. In a machine tool having a spindle member within a sleeve member, said members being relatively slidable, the improvement comprising clamping means interposed between said members for selectively securing said members together, said clamping means including clamp structure actuating means mounted for reciprocation axially relative to said members, clamp structure arranged around said spindle member between said actuating means and one of said members for applying a radial clamping force to said one member in response to axial movement of said actuating means in one direction, said clamp structure being fixed against axial movement in said one direction relative to said one member, and hydraulic fluid pressure means for moving said actuating means in said one direction.

15. The improvement as claimed in claim 14 including means for moving said actuating means in the direction opposite to said one direction to release said clamping structure from clamping engagement with said one member.

16. The improvement as claimed in claim 15 wherein said moving means comprises a spring.

References Cited
UNITED STATES PATENTS

| | | | |
|---|---|---|---|
| 3,103,144 | 9/1963 | Walter | 90—11 |
| 2,690,702 | 10/1950 | Romans et al. | 90—14 |

GERALD A. DOST, *Primary Examiner.*